J. E. HARROD.
PHOTOGRAPHER'S CAMERA STAND.
APPLICATION FILED MAR. 11, 1907.
920,135.
Patented May 4, 1909.
2 SHEETS—SHEET 1.
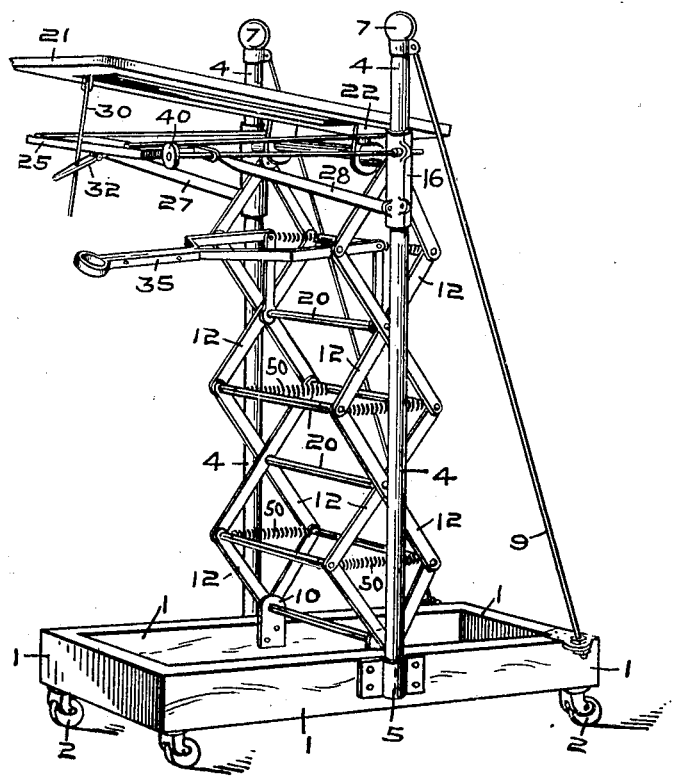
WITNESSES:
L. B. Woerner.
F. C. Dynes.
INVENTOR
Joel E. Harrod,
By Minturn Woerner
ATT'YS.

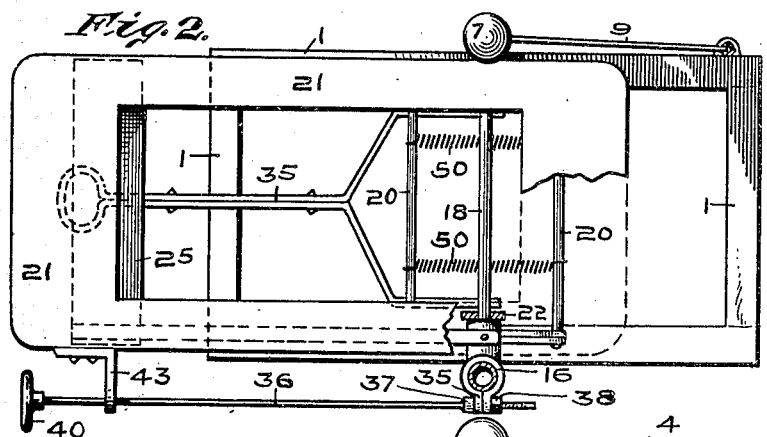
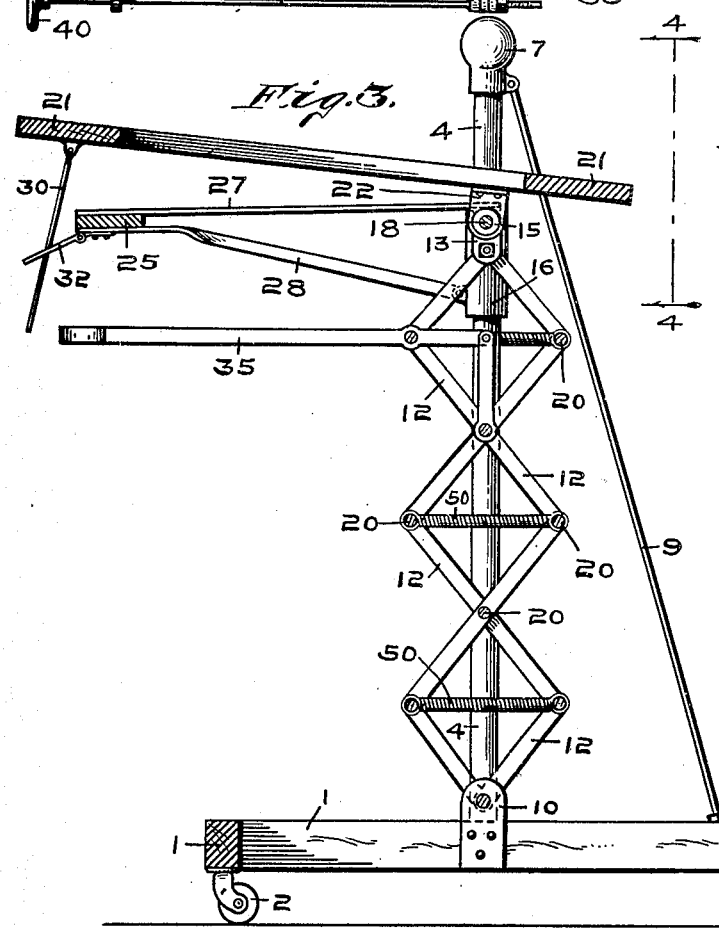
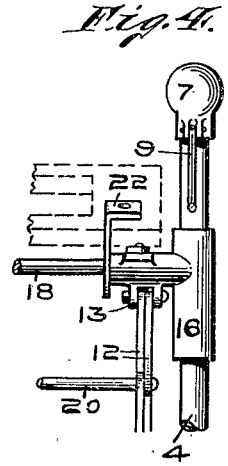

UNITED STATES PATENT OFFICE.

JOEL E. HARROD, OF INDIANAPOLIS, INDIANA.

PHOTOGRAPHER'S CAMERA-STAND.

No. 920,135.  Specification of Letters Patent.  Patented May 4, 1909.

Application filed March 11, 1907. Serial No. 361,825.

To all whom it may concern:

Be it known that I, JOEL E. HARROD, a citizen of the United States, residing at Indianapolis, in the county of Marion and State of Indiana, have invented certain new and useful Improvements in Photographers' Camera-Stands, of which the following is a specification.

This invention relates to a photographer's camera stand; and the object of the invention is to provide a stand of the above character which will be capable of supporting cameras so that the latter may be raised or lowered and can be inclined so as to readily direct the instruments upon the objects desired.

A further object consists in providing a photographer's camera stand which will have strength and rigidity so as to prevent vibration from reaching the camera.

A further object consists in a photographer's camera stand consisting of an arrangement whereby the weight of the instrument is counteracted or counterbalanced, thereby making same easy to elevate or lower, as may be desired.

I accomplish the objects of my invention by means of a photographer's camera stand as illustrated in the accompanying drawings, which form a part hereof, in which—

Figure 1 is a perspective view of a photographer's camera stand embodying my invention. Fig. 2 is a fragmentary plan view of the construction shown in Fig. 1. Fig. 3 is a central vertical sectional view of the construction shown in Fig. 2. Fig. 4 is a fragmentary detail view in elevation as seen from the dotted line 4—4 in connection with Fig. 3.

The camera stand shown in the drawings, which is one of the desired ways of constructing same, comprises a rectangular base 1 having sufficient area to add stability and rigidity to the stand; and the stand is provided with the casters 2 so that it may readily be shifted across the floor to any desired point. The base 1 is provided at each side near its center with the uprights 4 to form vertical guideways for the frame that supports the camera. These uprights are secured to the base 1 by means of the fastenings 5, which are bolted or otherwise secured in a fixed manner to said base. The upper ends of the uprights 4 are provided with suitable ornaments 7, merely to give the upper ends of said uprights a finished appearance. Brace-rods 9 are suitably attached to the ornamentations 7 and with the base 1 so that the uprights 4 may be retained in proper position.

The base 1 is provided at each side and adjacent to the uprights 4 with suitable bearing plates 10 which form suitable means for attaching the lower ends of the flexible or expansible toggle-columns 12, which jointly support the carrying frame for the camera. The upper ends of the toggle-columns 12 pivotally engage the ears 13 formed on the laterally extending hubs of the guide-blocks 16. These guide-blocks 16 envelop the uprights 4 so that the toggle-columns 12 and the supporting camera frame are prevented from moving in other than a determined direction. The guide-blocks 16, on the uprights 4, move in unison by being connected together to the transverse shaft 18 engaging the hubs 15, the latter forming an integral part with said blocks 16. The toggle-columns 12 are also tied together by means of the transverse rods 20.

The supporting frame 21 for the camera is pivotally mounted by means of the bearings 22 which may either engage the hubs 15 or the transverse shaft 18. This construction permits inclination from the horizontal to be imparted to both said frame and camera. A stationary rest 25 is also provided to carry the supporting frame 21 and camera when the latter is out of use. The stationary rest 25 comprises a transverse plate held in proper position by means of the rods 27 which extend to and connect with the hubs 15; and additional support is afforded said rest by means of the braces 28.

As before stated, the camera supporting frame 21 may be adjusted to impart the desired inclination to the camera and said frame is retained in the desired position by means of a rod 30 which is pivotally connected thereto. The rod 30 passes through an aperture in the plate 32 which is pivotally connected to the stationary rest 25, so that between the pivotal mounting of both the rod and plate the necessary binding is secured between them in forming a lock for holding the frame 21 and camera in the desired position. This is an extremely simple and efficient means for the purposes intended, but it will be understood that I have no desire to limit myself to this exact construction.

To facilitate the raising and lowering of the supporting frame 21 carrying the camera so that the latter may be instantly directed upon the object to be photographed, I provide a handle 35 which extends within easy reach of the operator and is bifurcated at the front and connects in any suitable manner to both sides of the toggle-columns 12 so that the stress will be equally distributed and a uniformity of movement secured. After the toggle-columns 12 have been expanded or contracted so as to raise or lower the camera into a desired position I provide a suitable locking device to prevent further movement of the camera after having once been properly focused upon the object. One way in which this lock may be secured, and as illustrated in the drawings, is to split one of the blocks 16 which slide on the uprights 4 (see Fig. 2). Each of the divided portions of said block 16 is provided with an ear or lug 35, and each having an aperture which registers with the other. The aperture in the ear formed on the forward portion of the guide-block 16 is provided with internal screw threads which engage corresponding threads on the end of the shaft 36. This shaft is provided with an integrally formed shoulder 37 which bears against the surface of the ear formed on the rear portion of the block so that when the shaft 36 is rotated the shoulder pressing against one ear and the screw threaded connection of the shaft with the other ear will tend to draw the two portions of the block toward each other and against the upright 4, thereby preventing further movement of the toggle-column. The front and threaded end of the shaft 36 is provided with a jam-nut 38 to prevent retraction of the shaft when set into operating position. The shaft 36 extends back to the edge of the stationary rest 25, so as to be within easy reach of the operator, and is provided with a hand-wheel 40 to facilitate the operation and secure the proper leverage for said shaft in clamping the block 16 against the upright 4. The outer end of said shaft 36 is suitably supported by the bracket 43, secured to the stationary rest 25.

In order that the camera may be elevated or lowered without undue labor on the part of the operator, and as large cameras are quite heavy and cumbersome to handle, I provide means to counteract, or in other words to counterbalance, the weight of the camera, and such additional weight as the material from which the toggle-columns 12 and the camera supporting frame 21 may add. The most desirable way of counteracting the weight of the material above enumerated is to interpose a plurality of coil-springs 50 between the transverse rods 20 that bind the two toggle-columns 12 together. The number of these springs necessary will depend on the weight to be sustained and the material from which they are formed, the intent being that the strength of the combined springs is to equalize the resistance exerted by the weight of the camera, the frame 21 and the toggle-columns 12. It will be readily seen that with the weight so counteracted the camera can be easily moved to the desired position. While I have shown springs for counteracting the weight of the toggle-columns 12, the supporting frame 21 and the camera, I have no desire to limit myself to this particular arrangement for it is readily seen that other means could be employed for counteracting said weight.

Having thus fully described my said invention, what I desire to secure by Letters Patent, is—

1. A photographer's camera stand comprising a base, a toggle column mounted on said base, vertical guides secured to the opposite sides of said base, and sleeves surrounding the vertical guides and engaging the upper portion of the toggle column and adapted to guide said column when expanded.

2. A photographer's camera stand comprising a base, a toggle column mounted on said base, vertical guides secured to the opposite sides of said base, sleeves surrounding the vertical guides and engaging the upper portion of the toggle column and adapted to guide said column when expanded, and means for clamping the sleeves against the vertical guides to hold the column in the desired position.

3. A photographer's camera stand comprising a base, a toggle column mounted on said base, vertical guides secured at opposite sides of said base, means on said guides to engage and guide the toggle column, and means for clamping the last named means against the vertical guides to hold the column in the desired position.

4. A photographer's camera stand comprising a base, a toggle column mounted on said base, vertical guides secured to the opposite sides of said base, means on said guides to engage and guide the toggle column, means for clamping the last named means against the vertical guides to hold the column in the desired position, a stationary frame mounted on said toggle column, a camera supporting frame carried by said stationary frame, a hinge-rod secured to the camera supporting frame, and a hinge-plate secured to the stationary frame and provided with an opening at its free end taking over said hinge-rod and adapted to automatically grip the same when the camera supporting frame is tilted.

In witness whereof, I have hereunto set my hand and seal at Indianapolis, Indiana, this, first day of March, A. D. one thousand nine hundred and seven.

JOEL E. HARROD. [L. S.]

Witnesses:
 F. W. WOERNER,
 L. B. WOERNER.